US008171205B2

(12) United States Patent
Royer et al.

(10) Patent No.: US 8,171,205 B2
(45) Date of Patent: May 1, 2012

(54) WRAP-AROUND SEQUENCE NUMBERS FOR RECOVERING FROM POWER-FALL IN NON-VOLATILE MEMORY

(75) Inventors: Robert Royer, Portland, OR (US); Han H. Chau, Portland, OR (US); Sanjeev N. Trika, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 889 days.

(21) Appl. No.: 12/151,207

(22) Filed: May 5, 2008

(65) Prior Publication Data

US 2009/0276586 A1 Nov. 5, 2009

(51) Int. Cl.

*G06F 12/00* (2006.01)
*G06F 13/00* (2006.01)
*G06F 13/28* (2006.01)
*G11C 11/34* (2006.01)
*G11C 16/04* (2006.01)
*G11C 7/00* (2006.01)
*G11C 7/22* (2006.01)
*G11C 7/10* (2006.01)

(52) U.S. Cl. .................. 711/103; 711/115; 365/185.33; 365/189.011; 365/189.04; 365/189.14; 365/189.16

(58) Field of Classification Search ........................ None
See application file for complete search history.

(56) References Cited

U.S. PATENT DOCUMENTS 4,321,667 A * 3/1982 Robbins et al. ................ 714/5.1
4,742,447 A * 5/1988 Duvall et al. ..................... 718/1
6,327,614 B1 * 12/2001 Asano et al. .................. 709/213
7,797,479 B2 9/2010 Trika et al.
2007/0005928 A1 * 1/2007 Trika et al. .................... 711/202
2007/0094445 A1 * 4/2007 Trika et al. .................... 711/113
2007/0150647 A1 6/2007 Shin et al.
2008/0098195 A1 * 4/2008 Cheon et al. .................. 711/202

FOREIGN PATENT DOCUMENTS

KR 0806343 2/2008

OTHER PUBLICATIONS

Office Action received for Korean patent application No. 2009-0069029 mailed on Oct. 26, 2010, 1 page of English translation.

Office Action received for Korean patent application No. 2009-0069029 mailed on Jun. 27, 2011, 1 page of English translation.

Office Action received for German patent application No. 102009019271.9 mailed on Jun. 14, 2010, 6 pages of Office Action and 6 pages of English translation.

(Continued)

*Primary Examiner* — Yaima Campos
*Assistant Examiner* — Craig Goldschmidt
(74) *Attorney, Agent, or Firm* — Grossman, Tucker, Perreault & Pfleger, PLLC

(57) ABSTRACT

Incrementing sequence numbers in the metadata of non-volatile memory is used in the event of a resume from power fail to determine which data in the memory is current and valid, and which data is not. To reduce the amount of metadata space consumed by these sequence numbers, the numbers are permitted to be small enough to wrap around when the maximum value is reached. Two different techniques are disclosed to keep this wrap around condition from causing ambiguity in the relative values of the sequence numbers.

21 Claims, 7 Drawing Sheets

OTHER PUBLICATIONS

Office Action received for German patent application No. 102009019271.9 mailed on Sep. 8, 2011, 6 pages of Office Action and 7 pages of English translation.

Office Action received for Chinese patent application No. mailed on Mar. 16, 2011, 3 pages of OA and 1 page of English translation.

* cited by examiner

WRAP-AROUND SEQUENCE NUMBERS FOR RECOVERING FROM POWER-FALL IN NON-VOLATILE MEMORY

BACKGROUND

Some types of non-volatile memory (for example, flash memory) cannot easily modify existing data in individual memory locations because they can only erase memory in entire blocks. When data changes are infrequent, changing the contents of the existing data can adequately be handled by copying the entire block to a new, previously erased, block with the new data values incorporated into the new block, and then erasing the old block so it will subsequently be available for use as a new block. When data changes are more frequent, a better technique may be to copy the page that is being changed into a new, previously empty page within the same block, with the new data values incorporated into the new page. This reduces the number of erase operations, which are costly in terms of time and effective lifetime of the memory, but it is more complicated because the new, current page must be distinguished from the old, stale page which still resides in memory. Multiple changes to the same data may result in several pages containing different versions of that data, only one of which is current and correct. Various techniques may be used to keep track of which pages are current and which are not, but this information is generally kept in volatile storage. A power-fail event wipes out this volatile information, thus requiring other techniques to reconstruct which pages are the current and correct ones upon recovery from the power fail. Assigning an incrementing, unique sequence number to each newly-written page, and placing that sequence number into the metadata of that page is one method that permits the most recent version of the page to be identified upon a power-fail recovery. For example, of all pages associated with the same logical address (according to each page's meta-data), the page with the highest sequence number is the most recent version of the page, and therefore the correct one. However, using sequence numbers that are large enough to be unique throughout the lifetime of the memory requires that many bits be reserved for the sequence number. Page metadata space is at a premium, and this approach is costly in that it uses a significant amount of metadata space.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
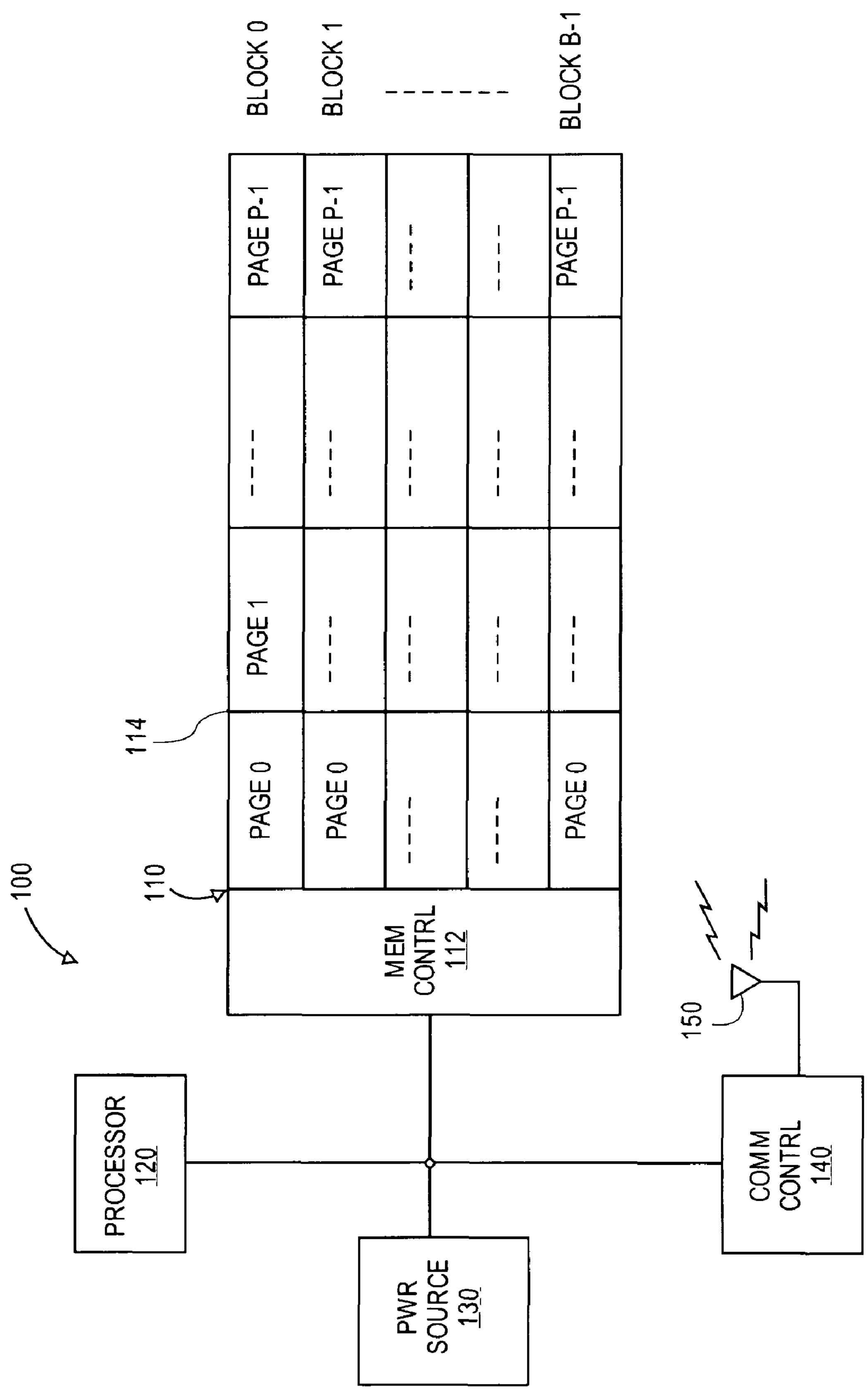
FIG. 1 shows a computer system with a non-volatile memory, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term 'flash' memory may be used frequently in the descriptions in this document. However, this term is intended as an example, and should not be used to limit various embodiments of the invention to memory types that are labeled with this term. In general, the embodiments of the invention described in this document may be used in any type of non-volatile memory that uses copy and block erase operations as a technique of changing the stored data. Some other, non-limiting, examples might be phase change memory, ferro-electric polymer memory, etc. The term 'block', as used in this document, refers to the memory space in an erase block in a non-volatile memory.

Various embodiments of the invention may use a sequence number range that is smaller than convention implementations, and wrap the sequence number back to its minimum value after it reaches its maximum value. This permits the use of a much smaller sequence number range, requiring fewer bits, since the same sequence number values may be used many times during the operational life of the memory. Because wrapping around in this manner may cause a recent sequence number to have a smaller value than an older sequence number that is still resident in the memory, different techniques are described to keep this condition from causing confusion when the memory structure is reconstructed during a resume from a power fail event. Some embodiments may use global sequence numbers (i.e., a single range of values is used through the entire non-volatile memory), while other embodiments may use local sequence numbers (the memory is divided into multiple portions, with each portion having its own sequence number range, which may duplicate the sequence number range of other blocks). Note: although this disclosure describes assigning a sequence number to each 'page', the reference to pages should not be seen as an implied limitation unless expressly claimed. Sequence numbers may be assigned to any other sub-unit of a memory erase block.

FIG. 1 shows a computer system with a non-volatile memory, according to an embodiment of the invention. System 100 comprises a non-volatile memory subsystem 110, processor 120, a power source 130, a communications controller 140, as well as other components not shown. The processor 120 may be used to control overall operations of the system, while the power source 130 may be used to provide electrical power to operate the various parts of the system. In some embodiments, power source 130 may comprise a battery, while in other embodiments it may comprise a power supply designed for connection to a local electrical outlet. Communications controller 140 may be used for communications with other devices external to the computer system 100. The example shows an antenna 150 for communicating wirelessly, but other forms of communication may be used. The system may also comprise other components not shown.

Memory subsystem 110 comprises a memory controller 112 to manage the internal operations of the memory subsystem 110, and non-volatile (NV) memory array 114. The NV memory array 114 may use any feasible technology, such as but not limited to 1) NOR flash memory, 2) NAND flash memory, 3) phase change memory, 4) ferro-electric polymer memory, 5) etc. The addressable storage of memory array 114 is shown divided into a quantity of B erase blocks, with each block containing a quantity of P pages. B and P may be any feasible quantities, and each page may contain any feasible quantify of bytes. Although the page numbers are shown repeated for each block, other embodiments may use other techniques (for example assigning globally unique page numbers totaling B×P. In operation, each page that contains data may have a sequence number written into its metadata, to help keep track of which pages are current.

Figure 2:
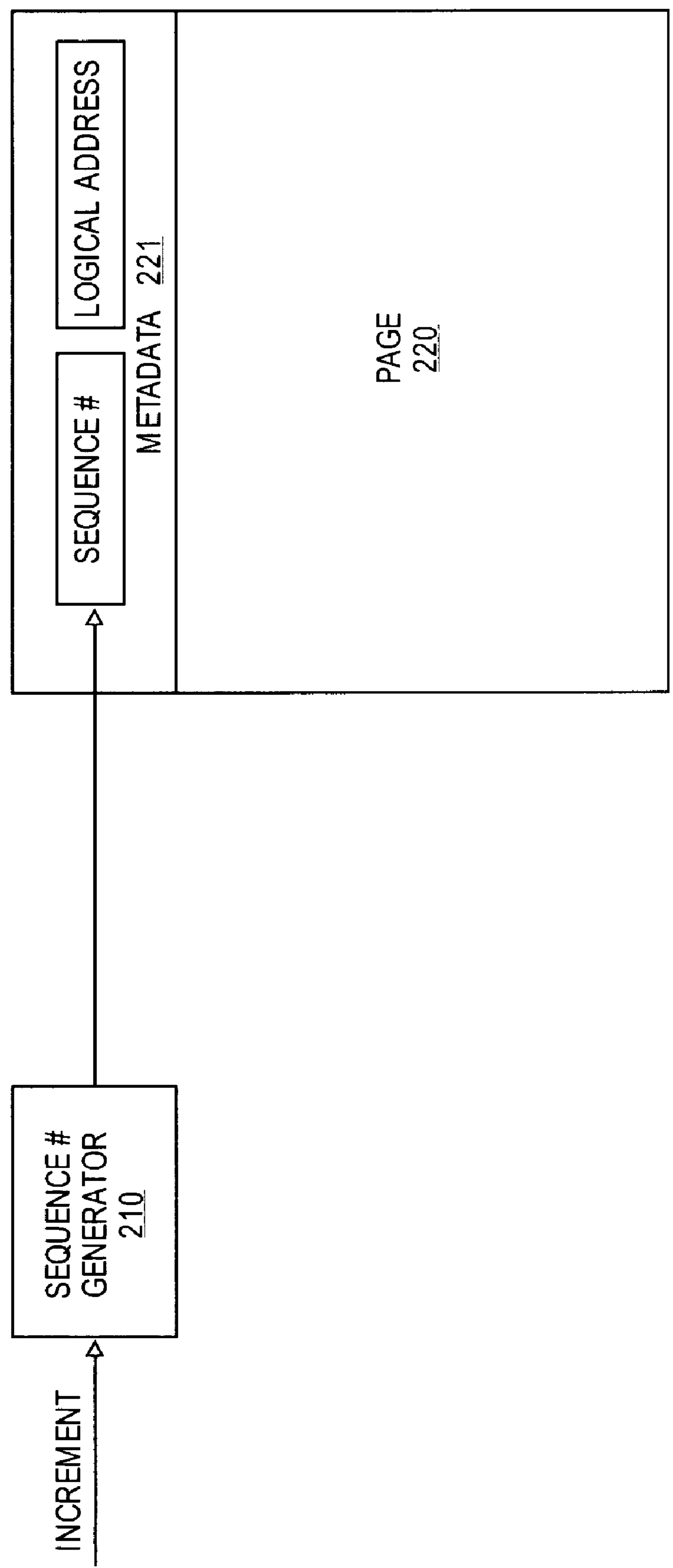
FIG. 2 shows a page of memory containing a sequence number, according to an embodiment of the invention.

FIG. 2 shows a page of memory containing a sequence number, according to an embodiment of the invention. Page 220 may be any of the pages shown in FIG. 1. Metadata 221 may be used to store information about the page, including the sequence number and the logical page address associated with this physical page at the time the sequence number was written into it. In some embodiments, the metadata may be located in storage elements that are not visible and/or not addressable external to the memory system (thus making the entire addressable range of the page available for storing user or system data), and the memory controller 112 of FIG. 1 may be used to write or read metadata to/from those storage elements. In other embodiments, a portion of the addressable storage space may be reserved for the metadata, thus reducing the amount of storage available for storing user/system data. In the latter case, the metadata may be stored in any feasible part of the page, such as but not limited to the beginning or the end of the page. The metadata may occupy any feasible number of bits. In one embodiment, the metadata may occupy 48 bits, with the sequence number occupying 32 of those bits plus a flag bit, but other embodiments may use other sizes for either or both of those parameters.

A sequence number generator 210 may be used to generate the sequence number that is to be assigned to, and stored with, the page. In some embodiments, a counter may be used to generate the sequence numbers, with the counter being incremented each time a new sequence number is to be assigned to a page. When global sequence numbers are used, each sequence number will be unique throughout the memory system, and a single counter may produce the sequence numbers for all the non-volatile memory. When local sequence numbers are used, each portion of memory may use its own sequence number generator to generate sequence numbers that may be unique only within that portion, and it may be possible for different portions of memory to be using the same sequence number at the same time. The following description assumes global sequence numbers, though that should not be seen as a limitation on the embodiments of the invention.

Figure 3:
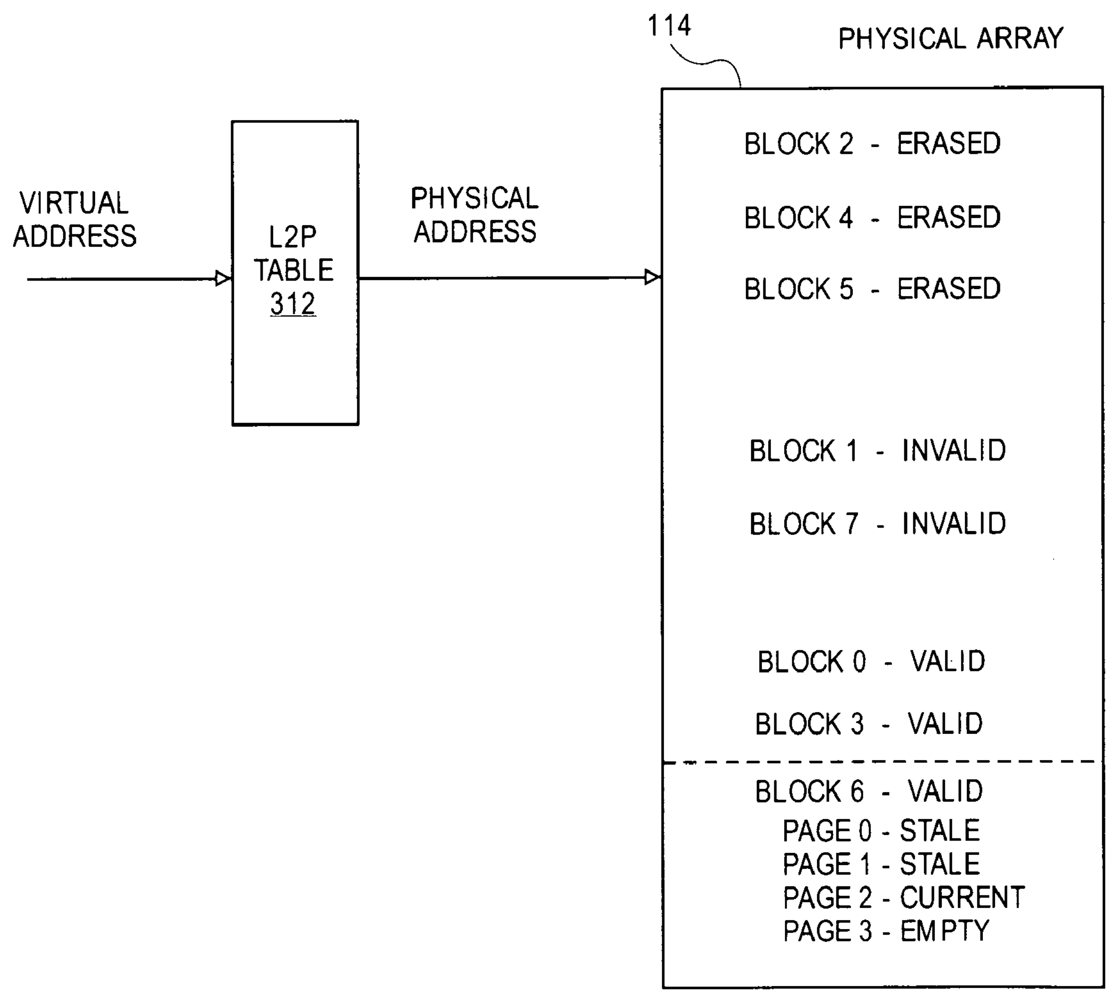
FIG. 3 shows a particular status of a memory subsystem during operation, according to an embodiment of the invention.

FIG. 3 shows a particular status of a memory subsystem during operation, according to an embodiment of the invention. Each physical block of memory may be designated as valid, invalid, or erased, depending on its current operational status. 'Valid' indicates that the particular block has current data stored in it, and that a request to access that data will be directed to that block. 'Invalid' indicates that all of the data in the block is no longer considered current for some reason, and a request for data will not be directed to this block. Most frequently, this status indicates that the block previously had valid data stored in it, but that data has been copied to another block which is now considered the valid block. 'Erased' indicates that the block has undergone an erase operation, and contains no valid or invalid data, and is ready to be used as a new block for a copy operation. The status of each block may dynamically change as the memory system is used for various purposes. For simplicity of illustration, only eight blocks of memory are shown, but a typical memory system may have many more blocks than this.

As shown for block 6, a valid or invalid block may have multiple pages in it, which are each designated as stale, current, or empty. An empty page is still in an erased state, has no system/user data in it, and is available to be subsequently used for storage of such data. A current page has data in it that is available for use, and a request for access to that data will be directed to that page. A stale page still has old data in it, but that data is no longer considered current and will not be used. In a typical operation, an erased block will have all its pages empty, and a valid block will have at least one current page, while an invalid block will have no current pages and at least one stale page. Both valid and invalid blocks may also have empty pages.

Once an erased block is targeted for a write operation, the data may be written into the (typically) first page. The status of the block then changes to valid, and the status of the first page changes to current. When the data in that page is to be modified later, the data may be read from the first page, modified, and the modified data written into the second page. The second page is then designated as current, while the first page is designated as stale. Another change to that data may result in the third page becoming current and the second page becoming stale. This may continue until there are insufficient empty pages left in the block for the next operation. At that point, or for some other reason, it may be desirable to place the data in the current page into a new, previously erased, block that has plenty of empty pages, and at that point the current page may be copied (with or without modification, depending on the operation) into a page of the new block with a new sequence number. It should not be necessary to copy the stale pages, since the data contained in them will not be used. The old page that was copied from may now be designated as stale, and the old block may now be considered invalid. This old, invalid block may subsequently be erased and made available for future memory operations. The act of erasing the old block may also erase all the old sequence numbers contained in the metadata of the pages in that block. Thus every valid and invalid page may have a sequence number in its metadata, while every empty page should have no sequence number in its metadata. In some embodiments, empty pages will contain a sequence number that has been initialized to a default value (such as but not limited to all 0's or all 1's). When reconstructing memory after a power fail, this default value should be interpreted has having no sequence number.

Although the previous description referred to only having a single current page in each block, this may be too limiting for some operations, and multiple current pages may exist simultaneously in the same block. However, these multiple current pages should be associated with different logical addresses, and therefore will be considered to have different sets of data rather than new and old versions of the same data. For simplicity of illustration, only four pages are shown per block, but a typical memory system may have many more pages per block (for example, 64 pages per block, although that number should not be considered an inferred limitation on the embodiments of the invention).

When data is to be written into a new page, the latest sequence number from the sequence number generator is written into the metadata for that page, and the logical address associated with that data is also written into the metadata. The next sequence number from the sequence number generator will subsequently be written into the metadata of the next page that is newly written into. If global sequence numbers are being used, that next sequence number may be written into a different block, or into the same block. But either way, the current page in a particular block will have a newer sequence number than any of the associated stale pages in that block, while the empty pages will effectively not have a sequence number. In conventional systems using sequence numbers, that means that the current page associated with a particular logical address will have a higher sequence number than any of the stale pages associated with that logical address, making it easy to identify which is the current page just by examining the sequence numbers. However, since the embodiments of this invention may use small sequence numbers that wrap around from their maximum value to their minimum value, it is possible that a newer sequence number may have a smaller absolute value than an older sequence value. Techniques for resolving this situation are described later.

Because the physical address of the block and page associated with a particular logical address may change as the data is copied to a new block and/or page, a logical-to-physical (L2P) table 312 may dynamically keep track of the conversion from the logical page address to the physical block/page address of each current page. However, the L2P table may be kept in volatile storage, which may be lost in the event of a power fail event. In such a case, the sequence numbers and logical addresses stored in the metadata for each page in memory may be used to reconstruct the L2P table upon recovery from the power fail. Some techniques for such reconstruction are presented in U.S. patent application Ser. No. 11/172,608, filed Jun. 30, 2005, entitled "Technique to Write to a Non-Volatile Memory". However, although the reconstruction process that occurs during a resume from power fail may benefit from the embodiments of the invention described herein, that reconstruction is not considered a part of these embodiments, and that application is not incorporated here by reference.

In the embodiments described here, conversion may be maintained for pages and blocks of addressable memory, but lower-order address bits (i.e., those contained within a page boundary) will be the same for both logical and physical addresses and don't need to be converted or reconstructed during the power fail recovery process. However, other embodiments may track conversion at a level of memory sub-units different than page boundaries, and the same principles may be applied to those sub-unit boundaries.

Once a sequence number is written into the metadata of a page, the sequence number may remain there until the block containing that page is erased. A sequence number will therefore be present in the metadata of both current and stale pages, in both valid and invalid blocks. A sequence number that is contained in the metadata of a page in memory is considered an 'active' sequence number. (Note: in some embodiments, an empty page may have a sequence number initialized to a default state, such as but not limited to all 0' or all 1's. An initialized sequence number shall be considered the same as no sequence number, and that page will not be considered active.) The metadata may also contain the logical address associated with that page at the time the data was written into that page. During the recovery from a power fail, by reading the metadata of every page during the recovery process, it may be assumed that all the pages having the same logical address in their metadata represent different versions of the same data, and the page in that group that has the highest sequence number will be considered the current page, while the other pages in that group will be considered stale. In this manner, the L2P table may be reconstructed, even though the current/stale status of each page was not preserved during the power fail.

Figure 4A:
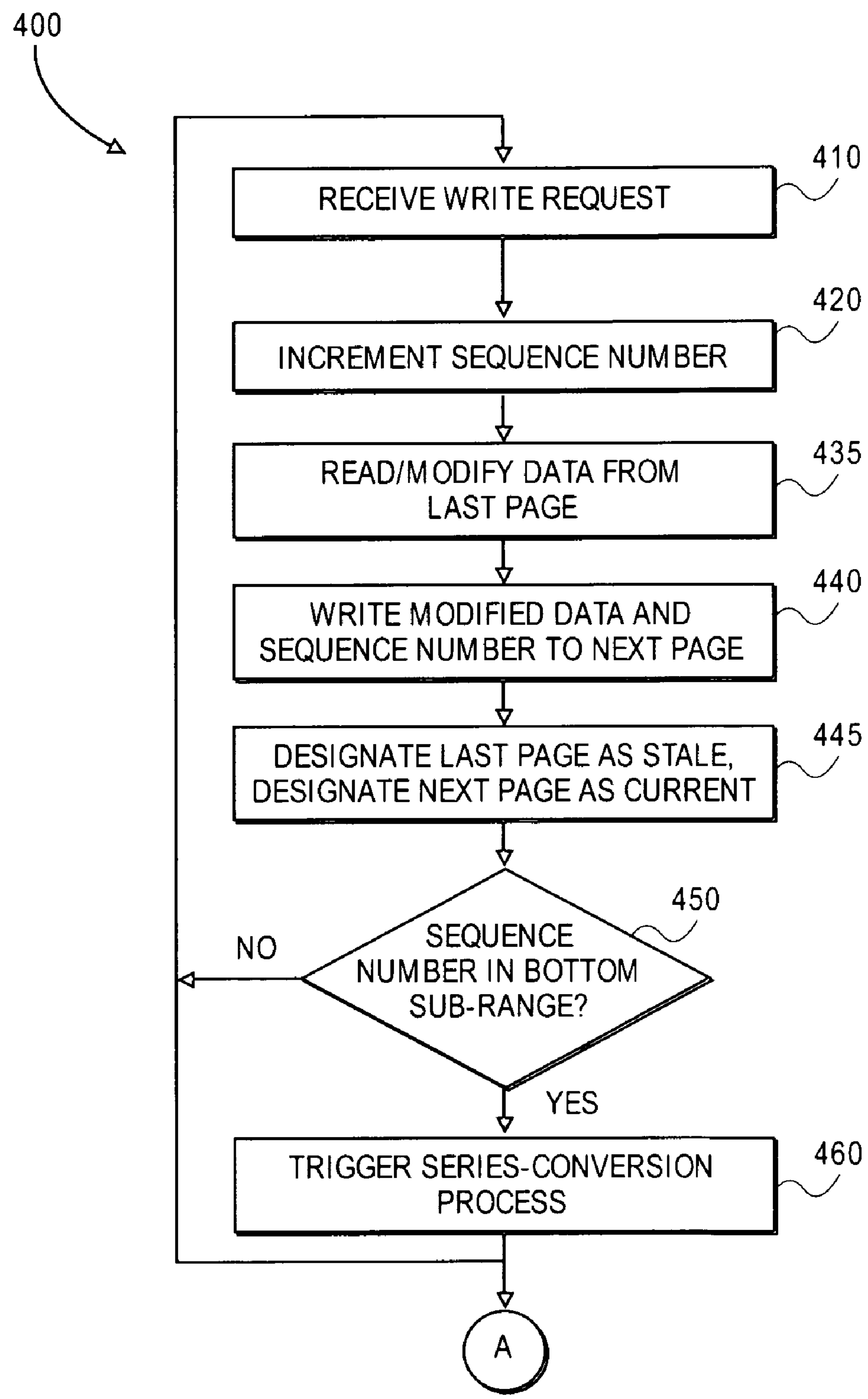
FIGS. 4A, 4B show a flow diagram of a method of using a dual range technique with sequence numbers in a non-volatile memory, according to an embodiment of the invention.
Figure 4B:
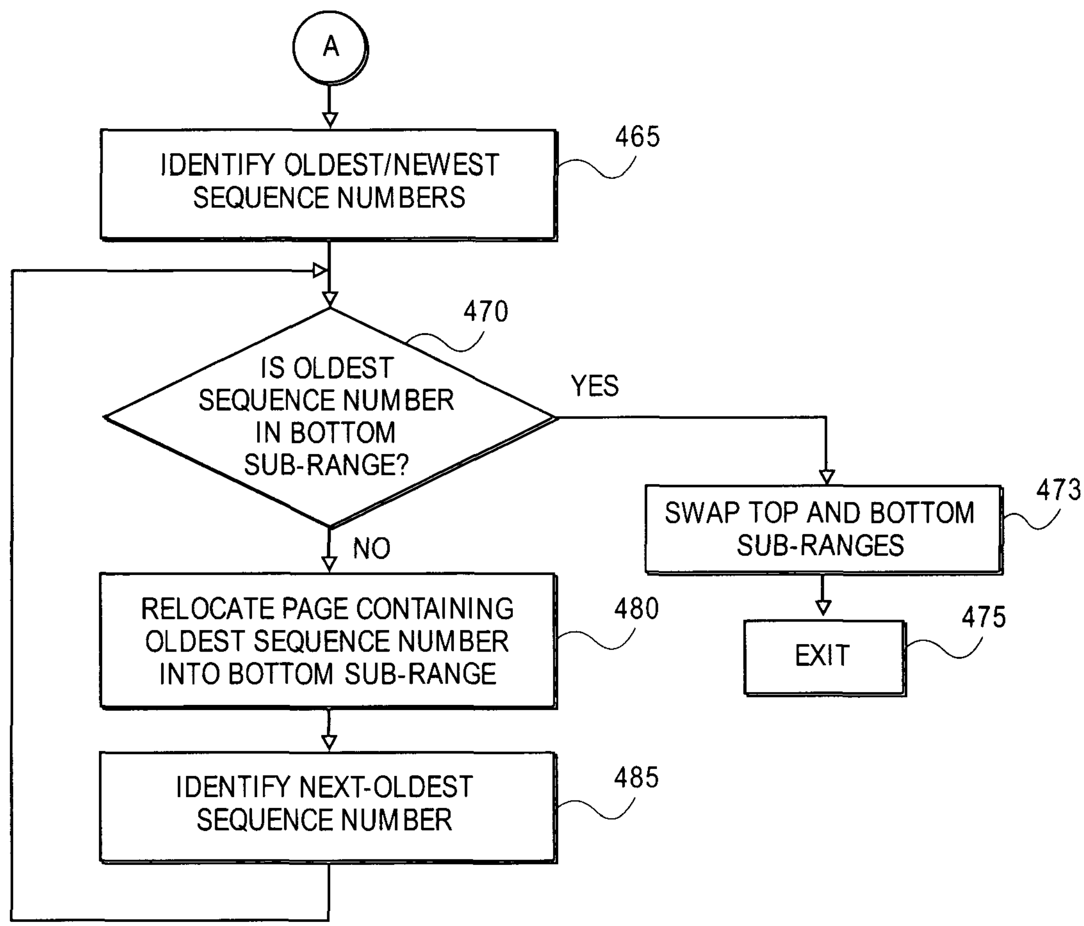
Figure 5A:
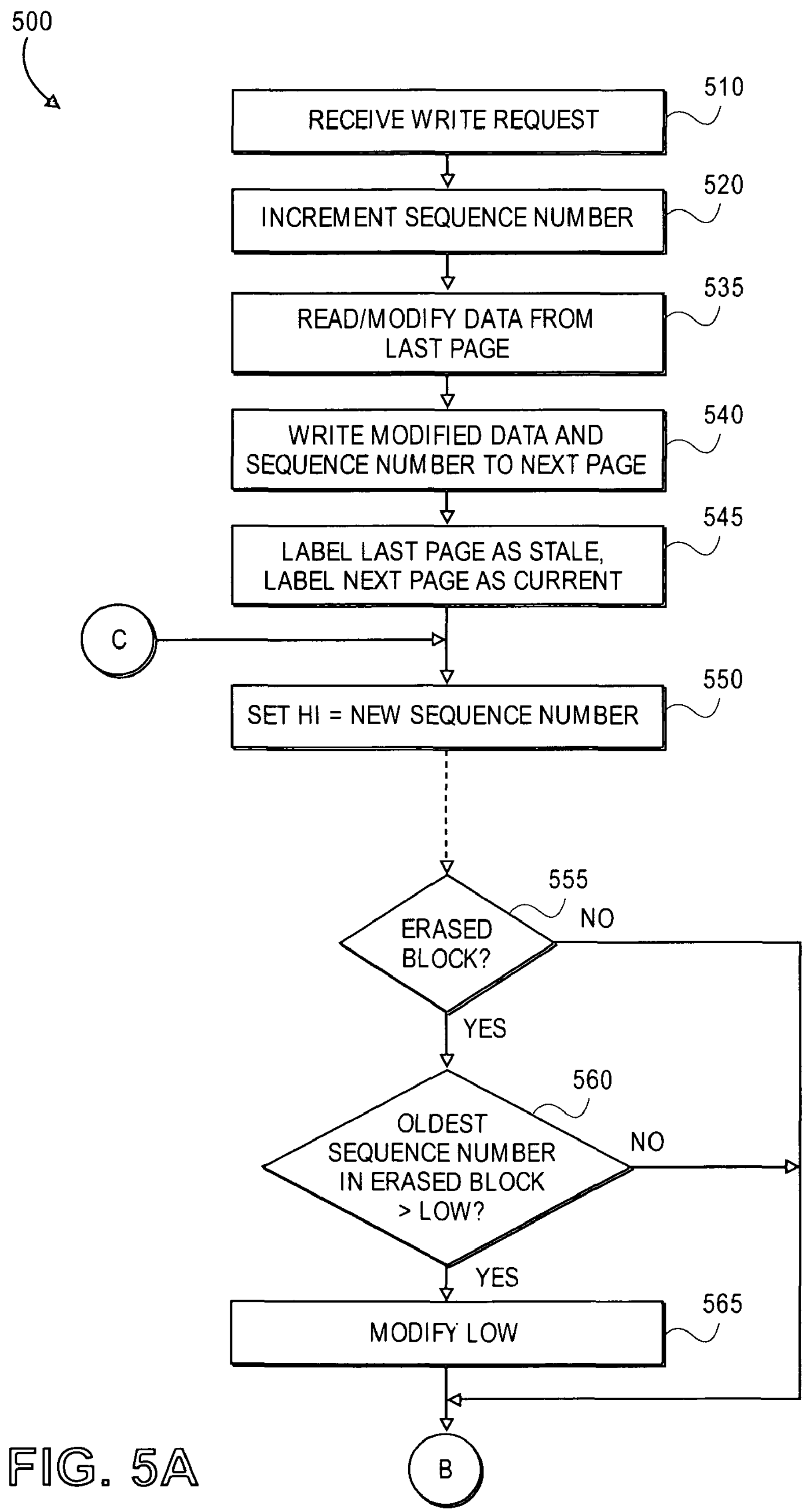
FIGS. 5A, 5B show a flow diagram of a method of using a moving range technique with sequence numbers in a non-volatile memory, according to an embodiment of the invention.
Figure 5B:
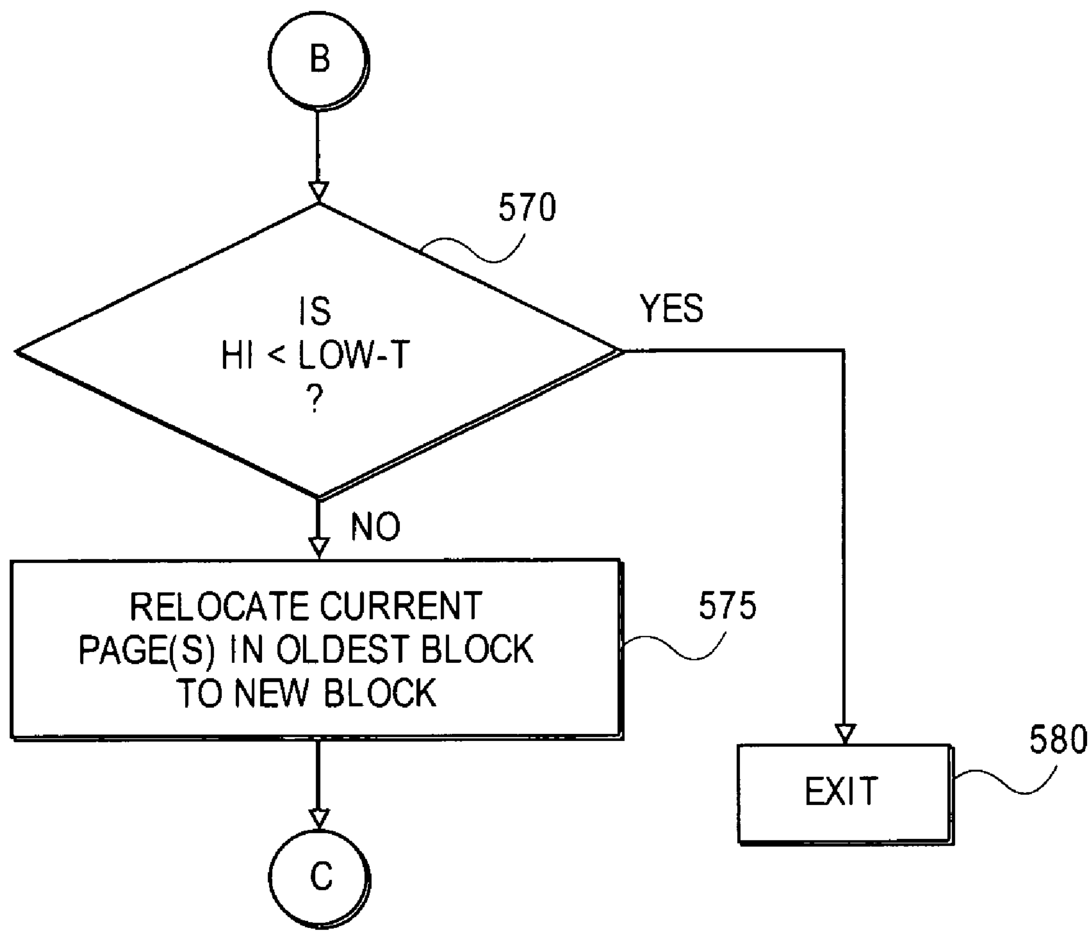

Since the incrementing sequence numbers are allowed to wrap around once the maximum value is reached, it is possible that a more recent sequence number will have a smaller absolute value than an older sequence number. This can cause confusion, since the smaller sequence number would otherwise be considered the older sequence number. The are two general methods described here to resolve that confusion, labeled as the 'dual-range' method and the 'moving-range' method. Each is described separately below. FIGS. 4A, 4B illustrate the dual range methods, while FIGS. 5A, 5B illustrate the moving-range method.

Dual Range Method

In the dual range method the sequence number range is divided into two sub-ranges. One embodiment divides the range into two equally sized sub-ranges, such as a lower-numbered sequence range of 0 . . . X, and a higher-numbered sequence range of (X+1) . . . ($2^N-1$), where N is the number of bits in the sequence number and $X=2^{(N-1)}$. This makes for a simple distinction, since the most significant bit can be used to identify which sub-range a given sequence number is in. In addition, a flag in non-volatile memory may be used to label the sub-range containing the most recent sequence number as the 'top' sub-range, while the other sub-range will be considered the 'bottom' sub-range. (Note the distinction between higher-numbered/lower-numbered sub-ranges, and top/bottom sub-ranges. At any given time, either the higher- or lower numbered sub-range may be designated as the top sub-range, and the other designated as the bottom sub-range.)

Should a power fail occur that requires rebuilding the memory structure upon recovery, all sequence numbers in the top sub-range will be considered higher than all sequence numbers in the bottom sub-range, irrespective of the actual numerical values of those numbers. Within each sub-range, however, the absolute value of the numbers determines which sequence number is higher. In essence, the flag may be considered an additional most significant bit that can be dynamically switched between the two sub-ranges. This technique will effectively resolve the confusion that would normally occur when the new sequence numbers wrap around to '0', by giving the most recent sequence numbers a higher effective value than the older sequence numbers.

However, even this technique may cause confusion if the range of sequence numbers still present in memory spans more than half the total sequence number range. For example, if the sequence number generator wraps around to 0, so that the most recent sequence number='0', the numerically lower sub-range (0 . . . X) would be declared the 'top' sub-range so that this new sequence number will have a higher effective value than the older sequence numbers in memory that have an absolute value of $2^N-1$, $2^N-2$, etc., but are now considered to be in the bottom range. However, a very old sequence number from the upper part of the new top sub-range (for example, an absolute value of X−4) would be in the new top sub-range with a higher absolute value than the most recent sequence number, which has an absolute value of 0.

To prevent this confusing condition from occurring, whenever the sequence number generator crosses from one sub-range to the other, a 'series-conversion' process may be initiated. This process may reassign new sequence numbers to pages as needed, so that all remaining pages will have sequence numbers in the same sub-range, which will be designated the top sub-range. One way to accomplish this reassignment is to copy all current pages with sequence numbers that are not in the same sub-range as the most recent sequence number, and assign new sequence numbers to each copy (which then becomes the 'current' version of that page), so that all current pages will have sequence numbers in the same sub-range. This sub-range may then be declared the top sub-range. The old pages that were the source of the copy may be designated as stale, the block they were in designated as invalid when there are no more current pages in it, and the invalid block subsequently erased. This technique also has the advantage of eventually eliminating all the associated stale pages from memory, since those stale pages may simply be left behind in the old block, to be erased. Although the old block may not be erased immediately, it is highly unlikely that the sequence numbers will move into a different sub-range again before such erasing occurs, so the aforementioned confusion will still be avoided.

FIGS. 4A, 4B show a flow diagram of a method of using a dual range technique with sequence numbers in a non-volatile memory, according to an embodiment of the invention. In some embodiments, the method may be performed in a memory controller for a non-volatile memory, but other embodiments may perform the method in other areas, or may perform parts of the method in the memory controller and other parts in other areas. In the illustrated flow diagram 400 starting in FIG. 4A, a request to write data into the NV memory may be received at 410, and at least one empty page located to write the data into. A new sequence number may be created at 420 by incrementing the previous sequence number. Although this incrementing is shown at a particular place in the flow, other embodiments may increment the sequence number earlier, and simply make this new, incremented sequence number available when it is needed.

If the data to be written into the page is a modified version of existing data, then the old data may be read from the last current page and modified at 435, and the modified data, as well as the new sequence number, written into the new current page at 440. The last current page may then be designated as stale, while the new page may be designated as current at 445. Note: if the data is new, so there is no existing version of it to modify, then operation 435 may be skipped, and the operation of designating the old page as stale at 445 may also be skipped.

Now that the new or modified data has been written into the page and the sequence number has been written into the page's metadata, the active sequence numbers in memory may be examined to determine if they need to be adjusted in some manner. At 450 it may be determined if the sequence numbers have crossed over into a different sub-range. If the new sequence number that was written at 440 is in a different sub-range than the immediately previous sequence number, then this crossover has occurred. It may have occurred because the sequence numbers crossed from the lower-numbered to the higher-numbered sub-range, or because the sequence numbers wrapped around by crossing from the higher-numbered to the lower-numbered sub-range. In either case, the sub-range containing the new sequence number is in the sub-range currently designated as the bottom sub-range, as determined at 450, and the aforementioned series-conversion process may then be triggered at 460. Since this process may involve a considerable amount copying and erasing, in some embodiments this process will be a background task, or other form of delayed task, and may not actually be performed until a later time, such as when the memory controller is relatively unbusy.

FIG. 4B illustrates the series conversion process that was triggered in FIG. 4A. The oldest and newest active sequence numbers (i.e., the active sequence numbers having the lowest effective value and the highest effective value, respectively) are identified at 465. This identification may be done in any feasible manner. The newest sequence number is still in the bottom sub-range, as the swap of the top/bottom sub-range designations has still not occurred at this point. At 470, the oldest sequence number may be examined to determine if it is also in the bottom sub-range. If so, the top/bottom range designations are swapped at 473 so that the sequence numbers are all in the top range, and the process may exit at 475. However, if the oldest sequence number is not in the bottom sub-range as determined at 470, then the current page having the oldest sequence number (or the current page associated with the stale page having the oldest sequence number) may be relocated to a new block at 480 by copying it to a new page in the new block, and giving the copy a new sequence number, which will be in the bottom sub-range. At 485, the next-oldest sequence number may be identified and its associated page subjected to the same process at 470-480-485. This may continue until all the current pages have sequence numbers in the bottom range, at which time the top and bottom sub-ranges may be swapped at 473 so that all current pages have sequence numbers in the top range. The process may then exit at 475.

The relocation process includes designating the old current page as stale once it has been copied into a new block with a new sequence number, and the copy has been designated as current. It is not necessary to relocate pages that were already designated as stale. The old block may be designated as invalid once it has no more current pages in it. The old block, including the old pages and old sequence numbers still stored in it, may then be erased and made available for future use. Relocating in this manner not only results in all current pages having sequence numbers in the same (top) sub-range, which was the goal, but it also removes all the stale pages in the old blocks from memory, along with their associated sequence numbers.

Moving Range Method

In the moving range method, indicators are maintained that identify the newest and oldest active sequence numbers in memory. For example, a parameter called HI may indicate the value of the newest active sequence number, while a parameter called LOW may indicate the value of the oldest active sequence number. If HI has a larger value than LOW, then the absolute values of the active sequence numbers represent their true relative ages, and no adjustment need be made. In this state, there will be no active sequence number with an absolute value that is smaller than LOW or larger than HI.

However, if LOW has a larger absolute value than HI, a wrap-around has occurred with the HI value. In this case, there should be no sequence number with an absolute value that is smaller than LOW and also larger than HI. Any sequence number in use that has a smaller value than LOW will be considered to be newer than LOW. To keep these two groups correct with respect to each other, a flag may be set to a '1' for each sequence number with an absolute value less than LOW, and set to '0'; for each sequence number with an absolute value greater than Hi. If this flag is considered an additional most significant bit for each sequence number, then the effective values, including the flag bit, of all the sequence numbers in use will be correct.

In the moving range method, any time a new sequence number is used, HI is set to the value of that new sequence number. Any time the oldest sequence number is erased, the value of LOW is modified to indicate the sequence number still in memory that is now the oldest. In the rare occurrence that the block containing the page with the newest sequence number is erased, the value of HI may be modified to indicate the sequence number still in use that is now newest. This might occur if the most recently-written data is removed from memory because the data is no longer useful to any program.

It is possible that the oldest active sequence number may remain in memory so long that the newest sequence number eventually overtakes it, so that HI=LOW. This would incorrectly imply that there are no sequence numbers in memory (and no valid or invalid blocks in memory). To avoid this ambiguous state, a minimum separation may be maintained between HI and LOW when the value of HI is approaching that of LOW from below. For example, a threshold separation value T may be set so that when the value of the newest sequence number=LOW−T, the current page in the block containing the oldest sequence number may be relocated to a new block and the relocated current page given a new sequence number. This allows the old block to be erased, which will also erase the old pages in that block and their sequence numbers. This is turn increases the value of LOW, which gives subsequent new sequence numbers more room to advance. When relocating the current page, it is not necessary to relocate the associated stale pages, and their sequence numbers will also be erased when the old block is erased.

FIGS. 5A, 5B show a flow diagram of a method of using a moving range technique with sequence numbers in a non-volatile memory, according to an embodiment of the invention. In flow diagram 500, operations 510-545 are the same as corresponding operations 410-445 in FIG. 4A, and are not described separately here. At 550, after the new or modified data has been written into the new page with a new sequence number, the parameter HI is set to the value of the new sequence number. At 555, it is determined whether a block is erased as a result of the operations of 530-545. If not, the processing may move to the top of FIG. 5B. If a block is erased as a result of operations 530-545 (or for other reasons), after that erase has taken place the processing may move to 560, where it is determined whether the oldest sequence number now in memory (after the erase) has a value greater than LOW. If not, processing may move to the top of FIG. 5B. However, if the oldest sequence number has a value greater than LOW (implying the previously oldest sequence number was eliminated by the erase), a new value for LOW may be set at 565 by finding the now-oldest sequence number in memory and setting LOW equal to that value. This process keeps the value of LOW equal to the oldest sequence number in memory, even after an erase operation eliminates the previously-oldest sequence number from the memory.

As previously mentioned, it is important not to let the value of HI wrap around and overtake the value of LOW, so FIG. 5B shows how this may be avoided. At 570, it may be determined if the value of HI is less than the value of LOW−T. In other words, when HI wraps around and is approaching the value of LOW from below, T is considered the minimum desired separation between Hi and LOW. If HI is less than LOW−T, then this separation is being maintained, and the process may exit at 580. However, when this minimum separation is reached, as determined at 570, then the current page in the block containing the oldest sequence number may be copied to a new block at 575, and given a new (higher) sequence number. This permits the old block to be erased. If there is more than one current page in the block containing the oldest sequence number, each of those current pages may be copied to a new block and given a new sequence number before permitting the old block to be erased.

Setting the values of Hi and LOW to reflect these changes may be accomplished by repeating operations 550-555-560-565 in FIG. 5A. Due to the time required to perform these operations, erasing only a single block may not be enough to maintain minimum separation between Hi and LOW (as determined at 570). Additional relocations and erasures may be accomplished by cycling through the loop 570-575-550-555-560-565 multiple times until the separation is achieved and the process exits at 580. The value of T may be chosen to accommodate the worst-case estimates of how long this process will take.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising:

a non-volatile memory; and a memory controller configured to;

control reads, writes, and erases of contents of the memory;

write a sequence number value into metadata of each sub-unit of a block if data is written into the sub-unit;

increment the sequence number value each time a new sub-unit is written into, and to wrap the sequence number around to a minimum value after a maximum value of the sequence number is reached, wherein a range of values from the minimum value to the maximum value comprises of a first range and a non-overlapping second range; and select a one of the first range and the second range containing a newest active sequence number as a top range, and to select the other of the first range and the second range as a bottom range;

wherein all active sequence numbers in the top range are designated to have a larger effective value than all active sequence numbers in the bottom range.

2. The apparatus of claim 1, wherein the sequence number is a global sequence number.

3. The apparatus of claim 1, wherein the maximum value is 2N-I, where N is the number of bits used to represent the sequence number value.

4. The apparatus of claim 1, wherein the memory controller is to:

relocate sub-units containing sequence numbers in the bottom range such that the relocated sub-units contains sequence numbers in the top range; and erase the block that contained the sub-unit having the sequence number in the bottom range.

5. The apparatus of claim 1, wherein the memory controller is to:

assign a value of a newest active sequence number to a first parameter; and assign a value of an oldest active sequence number to a second parameter.

6. The apparatus of claim 5, wherein the memory controller is to:

read data from a particular sub-unit;

modify the data and write the modified data to a new sub-unit;

write a new sequence number into the metadata of the new sub-unit; and reassign a value of the new sequence number in the new sub-unit to the first parameter.

7. The apparatus of claim 6, wherein the memory controller is to:

erase a particular block containing the particular sub-unit, said erase to include erasing the associated metadata; and assign the value of the now-oldest active sequence number to the second parameter.

8. The apparatus of claim 6, wherein the memory controller is to perform, resultant to determining that the first parameter is within a certain range of the second parameter, an operation comprising:

relocating a sub-unit containing the oldest sequence number to a new block and assigning a new sequence number to the relocated sub-unit;

erasing the block containing the sub-unit that contains the oldest sequence number, said erasing including erasing the associated metadata; and reassigning the value of the now-oldest active sequence number to the second parameter.

9. The apparatus of claim 1, further comprising a battery coupled to the non-volatile memory.

10. A method comprising:

incrementing a counter to generate a sequence number for writing into metadata in a non-volatile memory, each time data is to be written into a new page of the non-volatile memory;

wrapping the counter back to the counter's minimum value resultant to the counter reaching its maximum value, wherein a range of values from the counter's minimum value to the counter's maximum value comprises of a first range and a non-overlapping second range; and using the sequence numbers written into the metadata of multiple ones of the pages to determine which pages are current and which pages are stale, resultant to recovering from a power fail;

designating one of the first range and the second range containing a newest active sequence number as a top range, and selecting the other of the first range and the second range as a bottom range; and designating all active sequence numbers in the top range as having a larger value than all active sequence numbers in the bottom range.

11. The method of claim 10, further comprising:

relocating a page having a sequence number in the bottom range such that the relocated page contains a sequence number in the top range; and erasing the block containing the page having the sequence number in the bottom range.

12. The method of claim 10, further comprising:

assigning a value of a newest active sequence number to a first parameter; and assigning a value of an oldest active sequence number to a second parameter.

13. The method of claim 12, further comprising:

reading data from a particular page;

modifying the data and writing the modified data to a new page;

writing a new sequence number into the metadata of the new page; and assigning a value of the new sequence number in the new page to the first parameter.

14. The method of claim 13, comprising:

erasing a particular block containing the particular page, said erasing including erasing the associated metadata; and reassigning the value of the now-oldest active sequence number to the second parameter.

15. The method of claim 13, further comprising performing, resultant to determining that the first parameter is within a certain range of the second parameter, an operation comprising:

relocating a page containing the oldest sequence number to a new block and assigning a new sequence number to the relocated page;

erasing the block containing the page having the oldest sequence number, said erasing including erasing the associated metadata; and assigning the value of the now-oldest active sequence number to the second parameter.

16. An article comprising a non-transitory machine-readable medium that contains instructions, which when executed by one or more processors result in performing operations comprising:

incrementing a counter to generate a sequence number for writing into metadata in a non-volatile memory, each time data is to be written into a new page of the non-volatile memory;

wrapping the counter back to the counter's minimum value resultant to the counter reaching its maximum value, wherein a range of values from the counter's minimum value to the counter's maximum value comprises of a first range and a non-overlapping second range;

using the sequence numbers written into the metadata of multiple ones of the pages to determine which pages are current and which pages are stale, resultant to recovering from a power fail;

selecting one of the first range and the second range containing a newest active sequence number as a top range, and selecting the other of the first range and the second range as a bottom range; and designating all active sequence numbers in the top range as having a larger value than all active sequence numbers in the bottom range.

17. The medium of claim 16, wherein the operations further comprise:

relocating a page having a sequence number in the bottom range such that the relocated page contains a sequence number in the top range; and erasing the block containing the page having the sequence number in the bottom range, wherein said erasing includes erasing the associated metadata.

18. The medium of claim 16, wherein the operations further comprise:

assigning a value of a newest active sequence number to a first parameter; and assigning a value of an oldest active sequence number to a second parameter.

19. The medium of claim 18, further comprising:

reading data from a particular page;

modifying the data and writing the modified data to a new page;

writing a new sequence number into the metadata of the new page; and assigning a value of the new sequence number in the new page to the first parameter.

20. The medium of claim 19, comprising:

erasing a particular block containing the particular page and erasing the associated metadata; and assigning the value of the now-oldest active sequence number to the second parameter.

21. The medium of claim 19, further comprising performing, resultant to determining that the first parameter is within a certain range of the second parameter, an operation comprising:

relocating a page containing the oldest sequence number to a new block and assigning a new sequence number to the relocated page;

erasing the block containing the oldest sequence number, said erasing including erasing the associated metadata; and assigning the value of the now-oldest active sequence number to the second parameter.

* * * * *